(12) United States Patent
Kageyama

(10) Patent No.: US 10,837,484 B2
(45) Date of Patent: Nov. 17, 2020

(54) BOLT

(71) Applicant: IWATA BOLT CO., LTD., Tokyo (JP)

(72) Inventor: Masanao Kageyama, Tokyo (JP)

(73) Assignee: IWATA BOLT CO., LTD., Tokyo (JP)

(*) Notice: Subject to any disclaimer, the term of this patent is extended or adjusted under 35 U.S.C. 154(b) by 242 days.

(21) Appl. No.: 16/005,858

(22) Filed: Jun. 12, 2018

(65) Prior Publication Data

US 2018/0355904 A1 Dec. 13, 2018

(30) Foreign Application Priority Data

Jun. 13, 2017 (JP) .................................. 2017-115847

(51) Int. Cl.
| | | |
|---|---|---|
| *F16B 39/30* | (2006.01) | |
| *B21H 3/02* | (2006.01) | |
| *F16B 35/06* | (2006.01) | |
| *F16B 35/04* | (2006.01) | |

(52) U.S. Cl.
CPC ............... *F16B 39/30* (2013.01); *B21H 3/02* (2013.01); *F16B 35/047* (2013.01); *F16B 35/06* (2013.01)

(58) Field of Classification Search
CPC .. F16B 25/0057; F16B 25/0068; F16B 33/02; F16B 35/041; F16B 35/047; F16B 35/06; F16B 39/30; B21H 3/02
USPC .......................... 411/386, 411, 412, 424, 426
See application file for complete search history.

(56) References Cited

U.S. PATENT DOCUMENTS

| | | | | |
|---|---|---|---|---|
| 3,180,202 A | * | 4/1965 | Kahn ................... | F16B 25/0047 411/386 |
| 3,352,190 A | * | 11/1967 | Carlson ................. | F16B 23/003 411/403 |
| 3,978,760 A | * | 9/1976 | Muenchinger ......... | B21H 3/027 411/386 |
| 5,044,855 A | * | 9/1991 | Fukubayashi ....... | F16B 25/0021 411/386 |
| 5,244,327 A | * | 9/1993 | Whitesell ................. | F16B 5/02 411/386 |
| 5,609,455 A | * | 3/1997 | McKewan ............ | F16B 35/047 411/386 |
| 5,730,566 A | * | 3/1998 | Goodwin ................ | F16B 33/02 411/386 |
| 5,836,731 A | * | 11/1998 | Goodwin ................ | F16B 33/02 411/386 |

(Continued)

FOREIGN PATENT DOCUMENTS

JP 2016-156400 A 9/2016

*Primary Examiner* — Roberta S Delisle
(74) *Attorney, Agent, or Firm* — Paratus Law Group, PLLC

(57) ABSTRACT

A bolt includes a head portion and a shaft portion. The shaft portion includes an ordinary screw portion that meshes with a nut, and a guide screw portion that is provided on a distal end side of the ordinary screw portion and has a screw thread having a diameter smaller than that of a screw thread of the ordinary screw portion. A protective portion having a diameter larger than a minor diameter of the ordinary screw portion is formed continuously from the guide screw portion at a distal end of the guide screw portion. A pressure flank surface is formed at a distal end of the screw thread of the guide screw portion, but a clearance flank surface is not formed thereat.

5 Claims, 5 Drawing Sheets

(56) References Cited

U.S. PATENT DOCUMENTS

| | | | | |
|---|---|---|---|---|
| 6,062,786 A * | 5/2000 | Garver | ............... | F16B 35/047 |
| | | | | 411/386 |
| 6,077,013 A * | 6/2000 | Yamamoto | ............ | F16B 35/041 |
| | | | | 411/386 |
| 6,158,938 A * | 12/2000 | Savoji | ............... | F16B 35/047 |
| | | | | 411/386 |
| 6,685,411 B2 * | 2/2004 | Kato | ............... | F16B 33/02 |
| | | | | 411/386 |
| 6,796,761 B2 * | 9/2004 | Mizuno | ............... | F16B 35/047 |
| | | | | 411/386 |
| 7,438,512 B2 * | 10/2008 | Jakuszeski | ............ | F16B 2/065 |
| | | | | 411/311 |
| 8,632,288 B2 * | 1/2014 | Konagaya | ............ | F16B 35/047 |
| | | | | 411/386 |

* cited by examiner

BOLT

CROSS-REFERENCE TO RELATED APPLICATIONS

The present application claims the benefit of priority of Japanese Patent Application No. 2017-115847, filed on Jun. 13, 2017, the content of which is incorporated herein by reference.

TECHNICAL FIELD

The present invention relates to a bolt.

BACKGROUND ART

If a bolt is obliquely inserted into a nut, galling occurs between the bolt and the nut at the time of fastening. Therefore. Patent Document 1 discloses a bolt having an ordinary screw portion, a guide screw portion, and a cylindrical guide.

In the bolt described in JP-A-2016-156400, a gap in an axial direction is provided between a guide screw thread and the cylindrical guide. Therefore, an advancing amount of the cylindrical guide until the guide screw thread engages with an entrance of a female screw member is lengthened and an inclination at the time of bolt insertion is reduced without improving a dimension accuracy of an outer diameter of the cylindrical guide.

However, also in the bolt described in JP-A-2016-156400, the present inventor has found that there is room for improvement in suppressing of galling to the nut at the time of fastening.

SUMMARY

Accordingly, an object of the invention is to provide a bolt in which galling to a nut at the time of fastening is suppressed.

In order to achieve the object, there is provided a bolt according to an aspect of the invention including: a head portion; and a shaft portion. The shaft portion includes an ordinary screw portion that meshes with a nut, and a guide screw portion that is provided on a distal end side of the ordinary screw portion and has a screw thread having a diameter smaller than that of a screw thread of the ordinary screw portion. A protective portion having a diameter larger than a minor diameter of the ordinary screw portion is formed continuously from the guide screw portion at a distal end of the guide screw portion. A pressure flank surface is formed at a distal end of the screw thread of the guide screw portion, but a clearance flank surface is not formed thereat.

In the bolt described above, a tapered portion having a diameter that decreases toward the distal end may be provided at a front end of the protective portion.

According to the bolt of the invention, galling to the nut at the time of fastening is suppressed.

DESCRIPTION OF EMBODIMENTS

Figure 1:
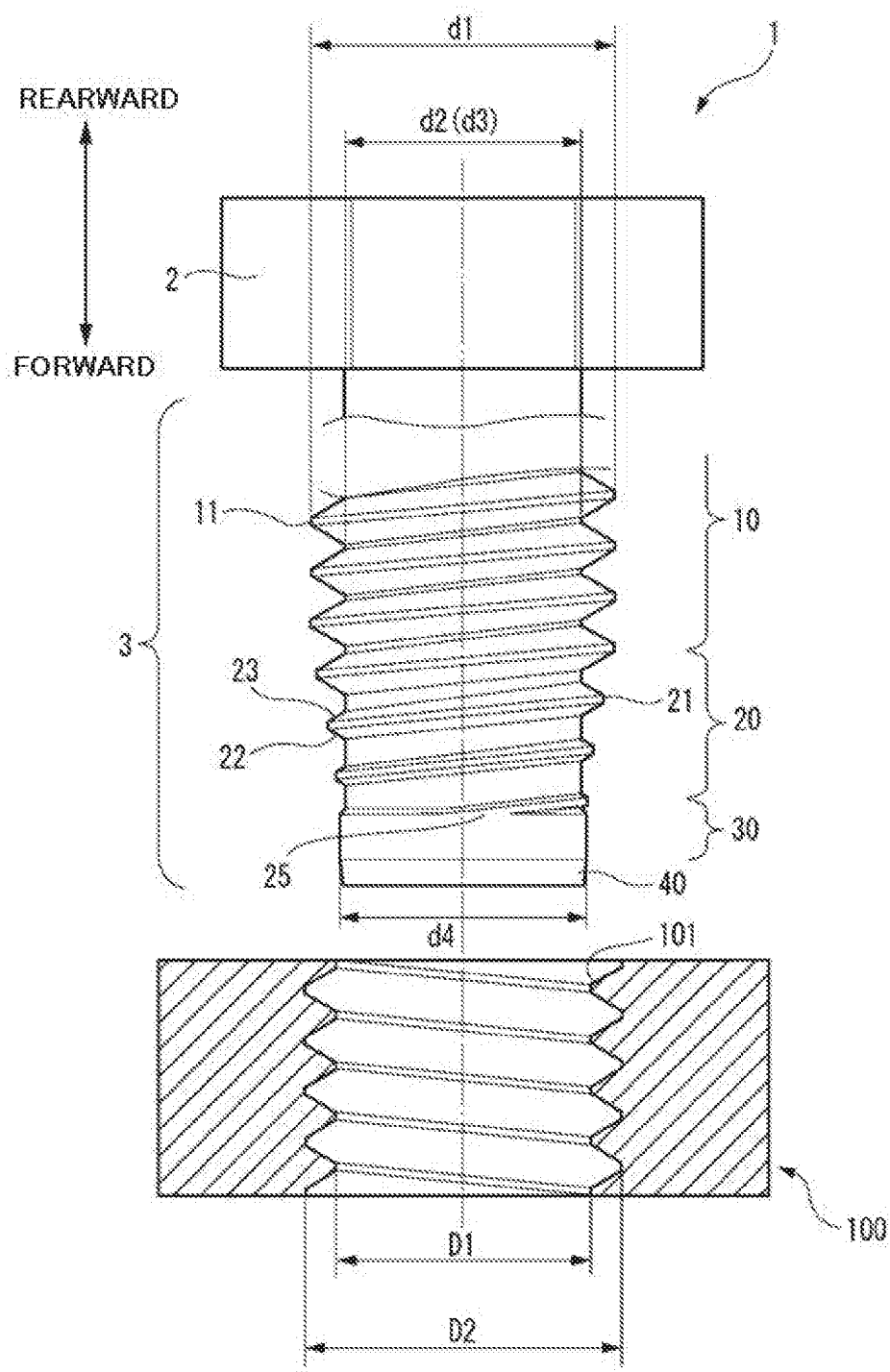
FIG. 1 is a view illustrating a nut and a bolt of an embodiment of the invention.

A bolt 1 according to an embodiment of the invention will be described with reference to the drawings. FIG. 1 is a view illustrating the bolt 1 and a nut 100.

As illustrated in FIG. 1, the bolt 1 includes a head portion 2 and a shaft portion 3. The shaft portion 3 extends in an axial direction of the bolt 1. In the following description, for convenience of explanation, a head portion 2 side in the axial direction is referred to as a rear side and a shaft portion 3 side in the axial direction is referred to as a front side. The head portion 2 is not limited to a hexagonal shape illustrated in the drawings and may be a cylindrical shape or a polygonal shape.

As illustrated in FIG. 1, the shaft portion 3 is provided with an ordinary screw portion 10, a guide screw portion 20, and a protective portion 30. The ordinary screw portion 10, the guide screw portion 20, and the protective portion 30 are provided in this order from the rear side to the front side in the axial direction.

The ordinary screw portion 10 is a portion meshing with a screw thread of the nut 100. An outer peripheral surface of the ordinary screw portion 10 is provided with screw threads (hereinafter referred to as ordinary screw threads 11). A major diameter (outer diameter) $d1$ of the ordinary screw thread 11 is the same in any portion in the axial direction. The major diameter $d1$ of the ordinary screw thread 11 is larger than a minor diameter (inner diameter) $D1$ of the internal thread of the nut 100 and is smaller than a major diameter $D2$ of the nut 100. A minor diameter $d2$ of the ordinary screw thread 11 is smaller than the minor diameter $D1$ of the internal thread of the nut 100.

The guide screw portion 20 is continuously provided with the ordinary screw portion 10. The screw thread (hereinafter referred to as a guide screw thread 21) of the guide screw portion 20 is continuous with the ordinary screw thread 11. The guide screw thread 21 is formed such that a thread height gradually decreases from the rear side to the front side. A thread height of a rear end of the guide screw thread 21 is equal to a thread height of a front end of the ordinary screw thread 11. A pitch of the guide screw threads 21 is equal to a pitch of the ordinary screw threads 11. A minor diameter $d3$ of the guide screw portion 20 is same as the minor diameter $d2$ of the ordinary screw portion 10.

The protective portion 30 is continuously provided with the guide screw portion 20. The minor diameter $d3$ of the guide screw portion 20 on the distal end side at a position, at which a major diameter (outer diameter) of the guide screw thread 21 is smaller than a lower limit value of a standard defined by JIS B 0209-2:2001 of the minor diameter $D1$ of the internal thread of the nut 100, is same or larger than a major diameter (outer diameter) of a front end 25 of the guide screw thread 21, so that the protective portion 30 is formed. Moreover, the standard defined by JIS B 0209-2:2001 is equivalent to ISO 965-2:1998.

An outer diameter $d4$ of the protective portion 30 is larger than the minor diameter $d3$ of the guide screw portion 20.

The protective portion 30 is continuously provided with a crest of the front end 25 of the guide screw threads 21. As illustrated in the drawing, the outer diameter d4 of the protective portion 30 may be constant irrespective of positions in the axial direction, or may be changed, for example, so as to be tapered toward the front side.

The major diameter d4 of the rear end of the protective portion 30 can be set to 80% or more and 90% or less of the major diameter d1 of the ordinary screw thread 11. The outer diameter d4 of the rear end of the protective portion 30 can be 90% or more and less than 100% of the minor diameter D1 of the internal thread of the nut 100.

The front end 25 of the guide screw thread 21 and the protective portion 30 are continuous, and the outer diameter d4 of the protective portion 30 is larger than the minor diameter d3 of the guide screw portion 20. Therefore, a clearance flank surface 22 is not formed at the front end 25 (distal end) of the guide screw thread 21. Moreover, a pressure flank surface 23 is formed at the front end 25 of the guide screw thread 21. The clearance flank surface 22 is an inclined surface facing the front side of the screw thread. The clearance flank surface 22 is an inclined surface positioned on a fastening partner (nut 100) side from the crest of the screw thread. The pressure flank surface 23 is a surface facing the rear side of the screw thread. The pressure flank surface 23 is an inclined surface positioned on a side opposite to the fastening partner (nut 100) from the crest of the screw thread.

As illustrated in FIG. 1, a tapered portion 40 having a diameter that decreases toward the distal end may be provided at the front end of the protective portion 30. The tapered portion 40 facilitates the insertion of the bolt 1 into the nut 100.

Figure 2:
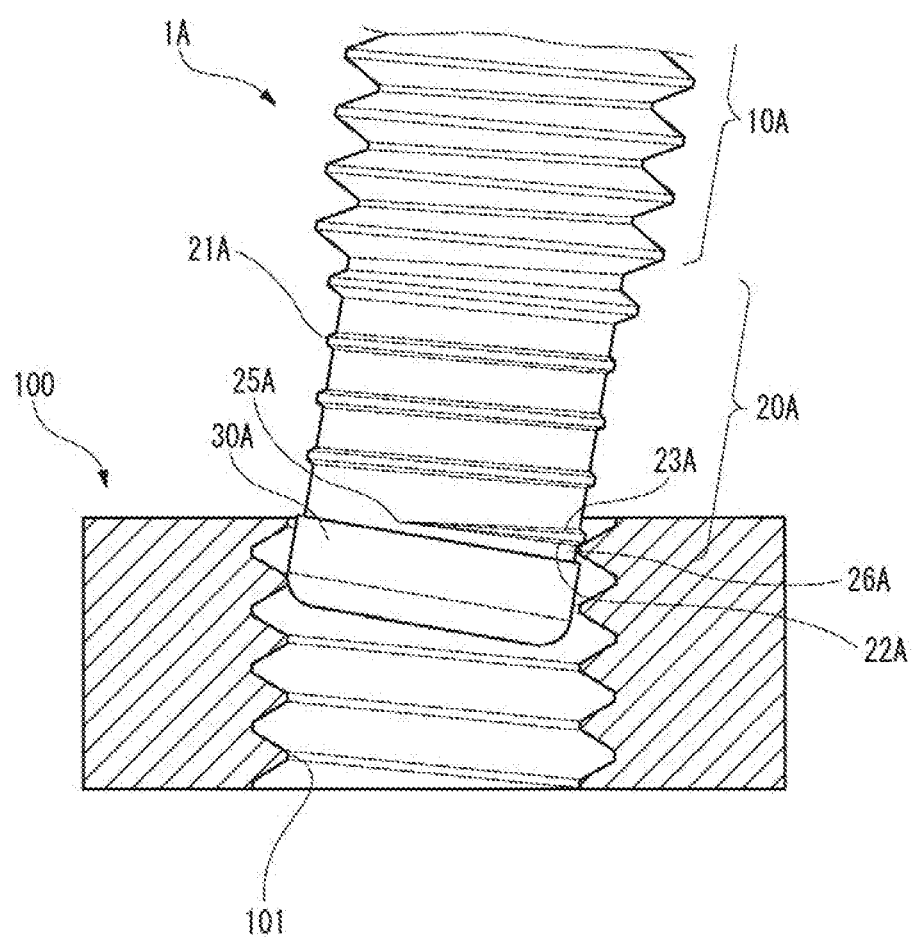
FIG. 2 is a view illustrating how a bolt of a comparative example is inserted in a state of being inclined with respect to a nut.

An effect of the bolt 1 according to the embodiment will be described with reference to FIGS. 2 and 3. First, a problem to be solved by the bolt 1 according to the invention will be described in detail with reference to a bolt 1A according to a comparative example of FIG. 2. FIG. 2 is a view illustrating how the bolt 1A of the comparative example is inserted in a state of being inclined with respect to a nut 100.

As illustrated in FIG. 2, in the bolt 1A of the comparative example, an ordinary screw portion 10A, a guide screw portion 20A, and a guide portion 30A having a diameter equal to or smaller than an outer diameter of a guide screw thread 21A are provided in a screw portion. The guide screw thread 21A is not continuous with the guide portion 30A. A thread height of the guide screw thread 21A gradually decreases toward a front end to converge to a root portion, and has a shape that eliminates the screw threads. Both a clearance flank surface 22A and the pressure flank surface 23A are formed on a front end 25A of the guide screw thread 21A. A screw thread having a minute height is formed between the front end 25A of the guide screw portion 20A and the guide screw thread 21A. Both the clearance flank surface 22A and the pressure flank surface 23A are also formed on the screw thread of the minute height.

In FIG. 2, when the bolt 1A is inserted in a state of being inclined with respect to the nut 100, at an initial stage of insertion, a screw thread 101 of the nut 100 abuts against the guide portion 30A, but as the bolt 1A is inserted, the screw thread 101 of the nut 100 falls into a valley portion 26A between the guide portion 30A and the guide screw portion 20A. The screw thread 101 of the nut 100 scratches the clearance flank surface 22A of the bolt 1A in the vicinity of the front end 25A of the guide screw thread 21A. Then, the front end 25A of the guide screw thread 21A may be sheared by the screw thread 101 of the nut 100. In this state, when the bolt 1A is screwed into the nut 100, fragments of the sheared front end 25A of the guide screw thread 21A are bitten between the bolt 1A and the nut 100, and galling occurs between the bolt 1A and the nut 100. Moreover, not only the front end 25A of the guide screw thread 21A but also a part of a front side of the guide screw thread 21A continuing from the front end 25A may be sheared by the screw thread 101 of the nut 100. As described above, the screw thread 101 of the nut 100 may shear the vicinity of the front end 25A of the guide screw thread 21A.

Figure 3:
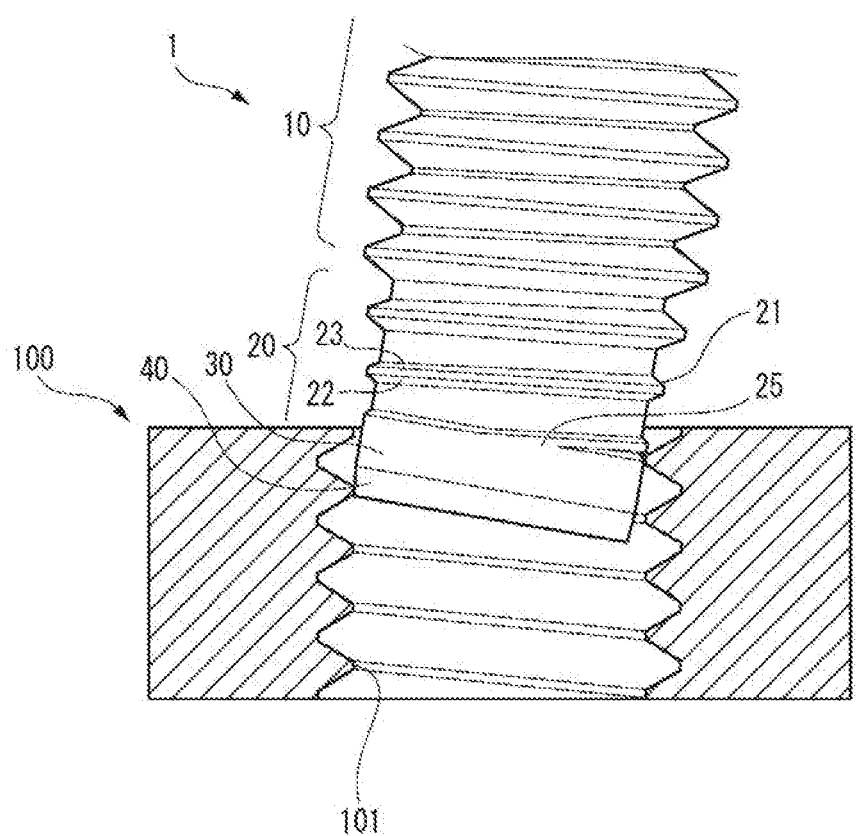
FIG. 3 is a view illustrating how the bolt of the embodiment is inserted in a state of being inclined with respect to the nut.

FIG. 3 is a view illustrating how the bolt 1 of the embodiment is inserted in a state of being inclined with respect to the nut 100. As illustrated in FIG. 3, when the bolt 1 is inserted in a state of being inclined with respect to the nut 100, in the initial stage of insertion, the screw thread 101 of the nut 100 abuts against the protective portion 30. As the bolt 1 is inserted, the screw thread 101 of the nut 100 slides on an outer periphery of the protective portion 30 and crosses a crest in the vicinity of the front end 25 of the guide screw thread 21. Therefore, the front end 25 of the guide screw thread 21 having the weakest strength is unlikely to apply a shearing force from the screw thread 101 of the nut 100, and the vicinity of the front end 25 of the guide screw thread 21 is unlikely to be sheared unlike the comparative example.

Moreover, when the bolt 1 is screwed into the nut 100, the screw thread 101 of the nut 100 comes into contact with the clearance flank surface 22 at a portion remote from the front end 25 of the guide screw thread 21. However, at a portion on the rear side remote from the front end 25 of the guide screw thread 21, the guide screw thread 21 is formed large to a certain extent and has a sufficient strength. In addition, since the front end 25 of the guide screw thread 21 is connected to the protective portion 30, a mechanical strength with respect to the shearing force acting on the clearance flank surface 22 increases as compared to that in the comparative example in which the front end 25A of the guide screw thread 21A is not connected to the guide portion 30A. Therefore, even if the shearing force is applied at a portion remote from the front end 25 of the guide screw thread 21 from the screw thread 101 of the nut 100, the vicinity of the front end 25 of the guide screw thread 21 is unlikely to be sheared from the bolt 1.

At the front end 25 of the guide screw thread 21, it is necessary to form the screw thread large to a certain extent in order to make it difficult for the shearing force to be applied by the pressure flank surface 23. Therefore, the outer diameter d4 of the rear end of the protective portion 30 is larger than the minor diameter d3 of the guide screw thread 21 by 0.15 P (P is the pitch of the guide screw threads 21) or more. Preferably, in a case of a coarse screw, the outer diameter d4 of the rear end of the protective portion 30 is larger than the minor diameter d3 of the guide screw thread 21 by 0.2 P or more. In a case of the coarse screw, it is preferable that the outer diameter d4 of the rear end of the protective portion 30 is equal to or less than 0.3 P of the minor diameter d3 of the guide screw thread 21.

In addition, in order to reduce an inclination angle of the bolt 1 obliquely inserted into the nut 100, the outer diameter d4 of the rear end of the protective portion 30 is equal to or larger than 90% and less than 100% of a lower limit value of the standard defined by JIS B 0209-2:2001 of the minor diameter D1 of the internal thread of the nut 100. Preferably, the outer diameter d4 of the rear end of the protective portion 30 is equal to or larger than 95% and less than 100% of the lower limit value of the standard defined by JIS B 0209-2: 2001 of the minor diameter D1 of the internal thread of the nut 100.

Moreover, in FIGS. 2 and 3, a case where the shearing force acts on the clearance flank surface 22 at the time of insertion of the bolt 1 into the nut 100 is described, but the same applies to a case where the shearing force acts on the pressure flank surface 23 at the time of insertion of the bolt 1 into the nut 100.

Figure 4:
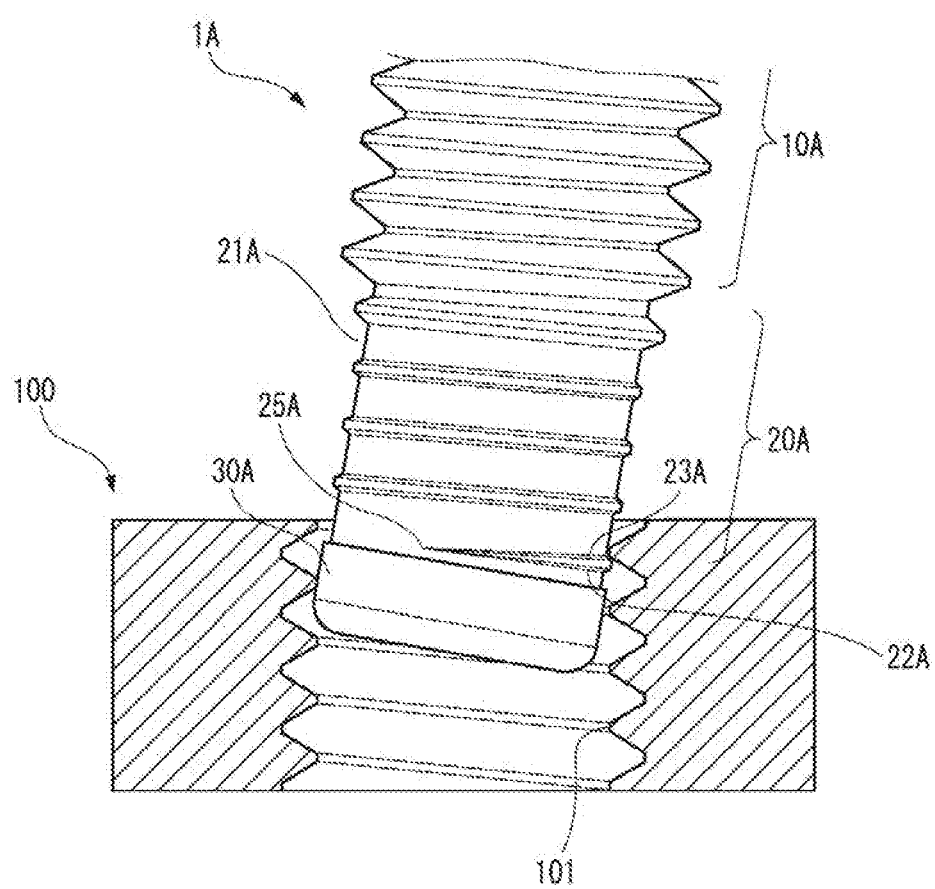
FIG. 4 is a view illustrating how the bolt of the comparative example is inserted in a state of being inclined with respect to the nut.
Figure 5:
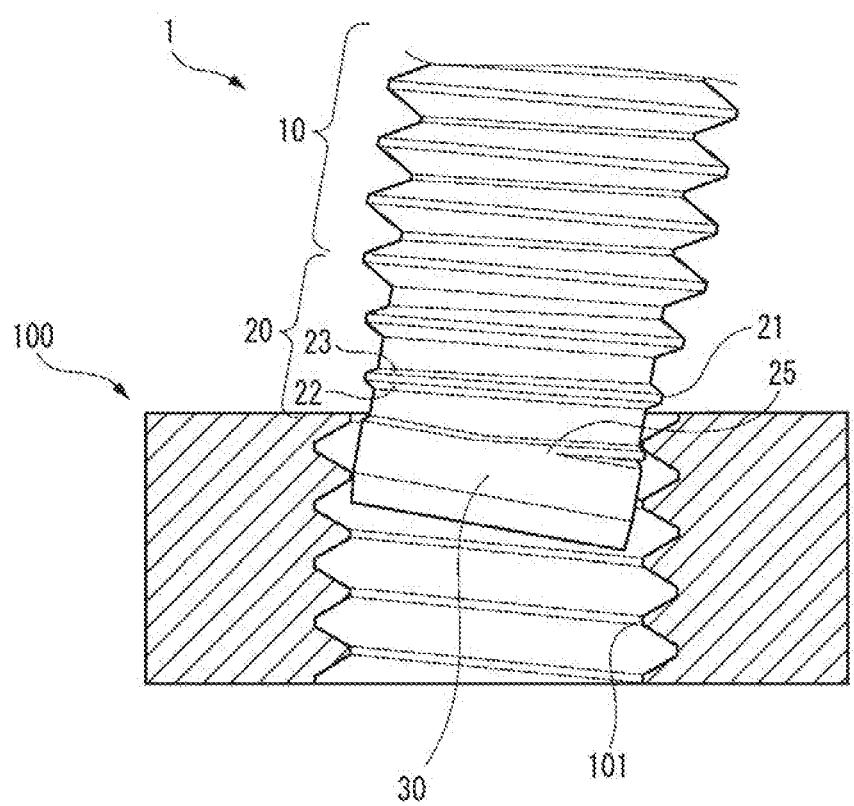
FIG. 5 is a view illustrating how the bolt of the embodiment is inserted in a state of being inclined with respect to the nut.

FIGS. 4 and 5 are views illustrating how the shearing force acts on the pressure flank surfaces 23A and 23 at the time of insertion of the bolts 1A and 1 into the nuts 100, respectively. FIG. 4 illustrates how the bolt 1A of the comparative example is inserted into the nut 100 similar to FIG. 2, and FIG. 5 illustrates how the bolt 1 of the embodiment is inserted into the nut 100 similar to FIG. 3.

As illustrated in FIG. 4, when the bolt 1A of the comparative example is inserted into the nut 100, the screw thread 101 of the nut 100 pushes the pressure flank surface 23A of the guide screw thread 21A and a force that pulls the bolt 1A into the nut 100 may act. In this case, in the bolt 1A of the comparative example, since the vicinity of the front end 25A of the guide screw thread 21A is small, shearing may occur when the shearing force is applied by the screw thread 101 of the nut 100. Fragments in the vicinity of the sheared front end 25A of the guide screw thread 21A causes galling to occur between the bolt 1A and the nut 100.

However, as illustrated in FIG. 5, according to the bolt 1 of the embodiment, since the front end 25 of the guide screw thread 21 is formed large to a certain extent and is connected to the protective portion 30, the mechanical strength increases. Therefore, even when the shearing force is applied from the pressure flank surface 23, the vicinity of the front end 25 of the guide screw thread 21 is unlikely to be sheared.

The invention claimed is:

1. A bolt comprising:
   a head portion; and
   a shaft portion,
   wherein the shaft portion includes
      an ordinary screw portion which meshes with a nut, and
      a guide screw portion which is provided on a distal end side from the ordinary screw portion and has a screw thread having a diameter smaller than that of a screw thread of the ordinary screw portion, and
   wherein a protective portion having a diameter larger than a minor diameter of the ordinary screw portion is formed continuously from the guide screw portion at a distal end of the guide screw portion, and a pressure flank surface is formed at a distal end of the screw thread of the guide screw portion, but a clearance flank surface is not formed thereat.

2. The bolt according to claim 1,
   wherein a tapered portion having a diameter which decreases toward the distal end is provided at a front end of the protective portion.

3. The bolt according to claim 1,
   wherein the protective portion is formed by making a minor diameter of the guide screw portion on the distal end side from a position, at which an outer diameter of a screw thread of the guide screw portion is smaller than a lower limit value of a standard defined by JIS B 0209-2:2001 of a minor diameter of the internal thread of the nut, to be equal to or larger than a major diameter of a front end of the screw thread of the guide screw portion.

4. The bolt according to claim 1,
   wherein the guide screw portion has a minor diameter that is same as the minor diameter of the ordinary screw portion.

5. The bolt according to claim 1,
   wherein an outer diameter of the protective portion is constant irrespective of positions in the axial direction.

* * * * *